Dec. 15, 1925.
W. J. LUTTON
1,566,027
POWER TRANSMITTING MECHANISM
Filed Sept. 7, 1923
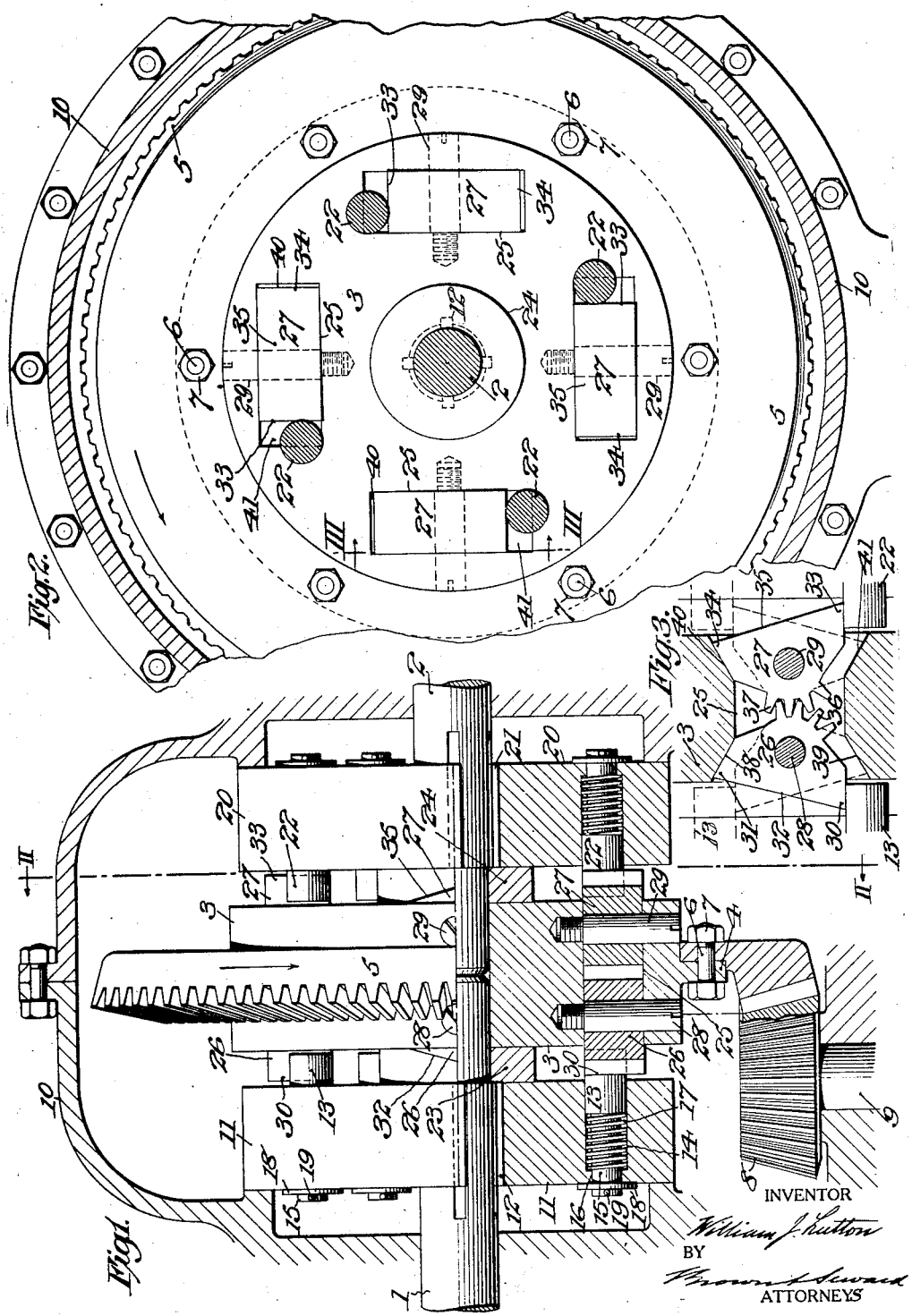
INVENTOR
William J. Lutton
BY
Brown & Seward
ATTORNEYS Patented Dec. 15, 1925.

1,566,027

UNITED STATES PATENT OFFICE.

WILLIAM J. LUTTON, OF PATERSON, NEW JERSEY.

POWER-TRANSMITTING MECHANISM.

Application filed September 7, 1923. Serial No. 661,446.

*To all whom it may concern:*

Be it known that I, WILLIAM J. LUTTON, a citizen of the United States, and resident of Paterson, in the county of Passaic and State of New Jersey, have invented a new and useful Improvement in Power-Transmitting Mechanism, of which the following is a specification.

This invention relates to improvements in power transmitting mechanism and particularly to the shafts of rear wheels of motor driven vehicles.

It has for its object to provide a structure so constructed that when installed between the shafts of two rear wheels of a motor driven vehicle, it will eliminate the breakage and wear incident to the difference in the rate of speed at which the two wheels rotate when turning out of a straight course or when passing over an uneven roadway.

Another object is to provide a structure which will deliver the power to both shafts uniformly, when the obstructing conditions are encountered, thereby equalizing the wear on the parts and preventing one shaft from rotating while the other remains still, as is frequently the case in uneven roadways and by stalling in mud or sand.

Another object is to provide a structure which is simple, inexpensive to manufacture, durable and efficient in operation.

Another object is to provide certain improvements in the form, construction and arrangement of the parts whereby the above named and other objects may be effectively attained.

A practical embodiment of my invention is represented in the accompanying drawing, in which—

Fig. 1 represents a detail horizontal section through the housing of the rear shafts of a motor driven vehicle having my invention applied thereto, certain of the parts being shown half in elevation and half in section.

Fig. 2 represents a detail vertical section taken in the plane of the line II—II of Fig. 1, looking in the direction of the arrows, and Fig. 3 represents a detail vertical section taken in the plane of the line III—III of Fig. 2, looking in the direction of the arrows.

The shaft sections of the divided driving shaft are denoted by 1, 2 respectively, with the outer ends of each of which a wheel (not shown) has a driving connection. The inner contiguous ends of the shaft sections are loosely mounted in a hub 3 having a peripheral flange 4, to which is secured a bevel ring gear 5 by means of bolts 6 and nuts 7.

A driving pinion 8 is secured to the propeller shaft 9 and arranged to mesh with the ring gear 5.

The shaft sections 1, 2 and propeller shaft 9 are supported in a housing 10, in any well known or approved manner.

The shaft section 1 is provided with a member 11, which is fixed to rotate with the shaft by means of one or more keys 12, in the present instance four are shown. This member 11 has mounted therein a plurality of laterally movable yielding driving devices, each of which comprises a plug 13, arranged to reciprocate in a recess 14 in the member, having a reduced portion 15, which passes through a hole 16 in the member. A spring 17 is disposed on the reduced portion 15 in the recess and serves to normally hold the plug at the limit of its outward movement. A washer 18 is held on the reduced portion 15 of the plug by means of a pin 19 secured therein, which pin and washer serve to limit the lateral movement of the plug 13 against the tension of the spring 17.

A member 20 is secured to the shaft section 2 by means of keys 21, which member is provided with laterally movable yielding driving elements in the form of spring actuated plugs 22. The member 20 and plugs 22 are constructed and operated similar to the member 11 and plugs 13.

The plugs 13 and 22 are oppositely disposed in their respective members and arranged to move toward and away from the hub 3. The member 11 is spaced from the hub 3 by a collar 23, and a collar 24 separates the member 20 from the hub 3. The hub 3 is provided with series of slots 25, in the present instance four are shown, arranged equi-distant. Within each of these slots is arranged a pair of oscillating pawls 26, 27. The pawl 26 is mounted to rock on a pivot 28, while the pawl 27 is mounted on a pivot 29. The pawl 26 is provided with off-set portions 30, 31 connected by a flat surface 32, and the pawl 27 has off-set portions 33, 34 and a flat surface 35. The pawl 26 is also provided with teeth 36 which coact with teeth 37 on the pawl 27. The position and relation of the teeth 36 and 37 control the simultaneous movement of the pawls, so that when the off-set portions 30 and 33 project from the slot 25 into the path of the plugs 13 and 22, the off-set portions 31 and 34 will be held within the slot, as clearly shown in Fig. 3. When the pawls are rocked the off-set portions 31 and 34 will be caused to project from the slot 25 and the portions 30 and 33 fall within the slot, as shown in dotted outline in Fig. 3. The pawl 26 is limited in its movement in one direction by the inclined wall 38 of the slot 25, and in the other direction by the inclined wall 39. The slot 25 is also provided with inclined walls 40, 41 which limit the movement of the pawl 27.

In operation the power is applied to the propeller shaft 9 and driving pinion 8 to the ring gear 5, which is driven in a direction indicated by the arrows on Figs. 1 and 2, which ring gear rotates the hub 3 with its pairs of pawls 26, 27, and as the pawls project into the path of the plugs 13 and 22, they are engaged thereby, causing the members 11 and 20 and aligned shaft sections 1 and 2 to be rotated with the hub and gear. When the power on the propeller shaft 9 is reversed, the hub 3 with its pawls 26 and 27 will be caused to travel in the opposite direction from that shown by the arrows in Figs. 1 and 2, in which movement the pawls will recede from their driving plugs 13 and 22 until the adjacent pair of plugs come into contact with the flat surfaces 32 and 35 of the pawls 26 and 27, whereupon the plugs 13 and 22 will ride upwardly on the flat surfaces until they pass the center of oscillation of the pawls. After the plugs have passed the center of oscillation of the pawls, the tension of the spring 17 on the plugs will be exerted upon the off-set portions 30, 33, which in turn will be forced into the slot 25, and the off-set portions 31, 34 caused to move outwardly into the path of the next approaching plug. When the off-set portions 31, 34 engage the plugs 13 and 22 the aligned shaft sections 1 and 2 will be driven in reverse direction. If for any reason one shaft is caused to overrun the other the plugs of that member will ride up upon their coacting flat surfaces of the pawls and will be depressed within its member until it passes the projecting off-set portion where it will again return to its driven position.

It is to be understood that various changes may be resorted to in the form, construction and arrangement of the several parts without departing from the spirit and scope of my invention; and hence, I do not intend to be limited to the details herein shown and described except as they may be included in the claims.

What I claim is:—

1. A power transmitting mechanism comprising, alined shaft sections, members thereon, yielding reciprocating devices in said members, a driven element, and interengaging means mounted to oscillate in said element and arranged to coact with said devices for rotating said shaft sections.

2. A power transmitting mechanism comprising, alined shaft sections, members thereon, yielding reciprocating devices in said members, a driven element, and oscillating means mounted in said element and arranged to engage said devices for rotating said shaft sections, said means comprising a pair of pawls arranged to interengage to produce simultaneous actuation.

3. A power transmitting mechanism comprising, alined shaft sections, members thereon, yielding reciprocating devices in said members, a driven element, and oscillating means mounted in said element and arranged to engage said devices for rotating said shaft sections, said means comprising a pair of pawls having teeth arranged to coact to produce simultaneous actuation.

In testimony, that I claim the foregoing as my invention, I have signed my name this 21st day of August, A. D. 1923.

WILLIAM J. LUTTON.